US012766629B2

(12) United States Patent
Sicre

(10) Patent No.: US 12,766,629 B2
(45) Date of Patent: Oct. 20, 2026

(54) ADDITIVE MANUFACTURING METHOD BY DEPOSITION OF MATERIAL UNDER FOCUSED ENERGY ENABLING PRODUCTION OF INTERSECTING RIBS AND RIBBED PART OBTAINED USING SAID METHOD

(71) Applicant: Airbus Operations SAS, Toulouse (FR)

(72) Inventor: Matthieu Sicre, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 702 days.

(21) Appl. No.: 18/314,365

(22) Filed: May 9, 2023

(65) Prior Publication Data

US 2023/0364680 A1 Nov. 16, 2023

(30) Foreign Application Priority Data

May 16, 2022 (FR) ....................................... 2204600

(51) Int. Cl.
*B23K 15/00* (2006.01)
*B23K 10/02* (2006.01)
(Continued)

(52) U.S. Cl.
CPC ........ *B23K 15/0086* (2013.01); *B23K 10/027* (2013.01); *B23K 26/342* (2015.10); (Continued)

(58) Field of Classification Search
CPC ......................... B23K 10/027; B23K 15/0086; B23K 26/342; F29C 64/118; B33Y 10/00
See application file for complete search history.

(56) References Cited

U.S. PATENT DOCUMENTS 10,532,511 B2 * 1/2020 Patrov ................... B29C 64/106
2018/0281284 A1 * 10/2018 Elgar .................... B29C 64/371
(Continued)

FOREIGN PATENT DOCUMENTS

CN 116213907 B * 7/2023 ......... B23K 15/0086
RU 2683104 C1 3/2019
(Continued)

OTHER PUBLICATIONS

French Search Report for corresponding French Patent Application No. 2204600 dated Dec. 21, 2022; priority document.

*Primary Examiner* — Matthew Wiblin
(74) *Attorney, Agent, or Firm* — Greer, Burns & Craint, Ltd.

(57) ABSTRACT

A method for additive manufacturing at least one intersection of first and second ribs by stacking layers of material, at least one layer of material of a first section of the first rib being obtained by depositing at least one bead of material that extends on respective opposite sides of the intersection. Wherein in that at least one layer of material of a second section of the second rib comprises a first part obtained by depositing at least one bead of material at a distance from the first section that extends in the direction of the second section and a second part obtained by depositing at least one bead of material adjacent to the first section that extends in the first direction. Also a method of manufacturing a ribbed panel and a ribbed panel.

11 Claims, 3 Drawing Sheets

(51) Int. Cl.

| | |
|---|---|
| ***B23K 26/342*** | (2014.01) |
| ***B29C 64/118*** | (2017.01) |
| ***B33Y 10/00*** | (2015.01) |
| ***B33Y 80/00*** | (2015.01) |

(52) U.S. Cl.
CPC ............ *B29C 64/118* (2017.08); *B33Y 10/00* (2014.12); *B33Y 80/00* (2014.12)

(56) References Cited

U.S. PATENT DOCUMENTS

| | | | | |
|---|---|---|---|---|
| 2019/0299522 | A1* | 10/2019 | Chapiro | B29C 70/38 |
| 2020/0079013 | A1* | 3/2020 | Linde | B33Y 10/00 |
| 2021/0046694 | A1* | 2/2021 | Rowe | B33Y 80/00 |
| 2021/0154732 | A1 | 5/2021 | Almeida | |
| 2023/0124104 | A1* | 4/2023 | Johnson | B33Y 10/00<br>264/308 |
| 2024/0131608 | A1* | 4/2024 | Huang | B23K 9/04 |

FOREIGN PATENT DOCUMENTS

| | | | | | |
|---|---|---|---|---|---|
| WO | WO-2019040795 | A1 * | 2/2019 | | B33Y 80/00 |
| WO | 2020038929 | A1 | 2/2020 | | |

* cited by examiner

ADDITIVE MANUFACTURING METHOD BY DEPOSITION OF MATERIAL UNDER FOCUSED ENERGY ENABLING PRODUCTION OF INTERSECTING RIBS AND RIBBED PART OBTAINED USING SAID METHOD

CROSS-REFERENCES TO RELATED APPLICATIONS

This application claims the benefit of French Patent Application Number 2204600 filed on May 16, 2022, the entire disclosure of which is incorporated herein by way of reference.

FIELD OF THE INVENTION

The present application relates to an additive manufacturing method by deposition of material under focused energy enabling production of intersecting ribs and a ribbed part obtained using said method.

BACKGROUND OF THE INVENTION

In a first manufacturing technique a ribbed panel is obtained from a block of material that has a thickness substantially equal to that of the ribbed panel to be obtained and is machined in order to remove the material between the ribs. In one operating method the tool used for the removal of material is a milling cutter.

On completion of machining the zones of the panel between the ribs are substantially plane. The same applies for the lateral faces of the ribs outside the zones of intersection. At the level of these zones of intersection the lateral faces of the ribs are interconnected by curved zones that have a radius of curvature identical to that of the milling cutter used for the removal of material.

This manufacturing technique is relatively slow and generates great losses of material in the form of swarf. When the machined material is titanium the swarf generated during machining cannot be reused. Although for some materials the swarf generated can be reused, the method of processing it is relatively costly.

To reduce the quantity of waste, in another manufacturing technique a part is produced by additive manufacturing by stacking layers of material obtained by melting a material using a focused energy source, such as a laser beam or an electron beam for example. In a directed energy deposition (DED) technique using focused energy the material in the form of wires is deposited simultaneously with the input of energy.

In this additive manufacturing technique it is possible to produce a rib by superposing a plurality of layers of material each obtained by depositing a wire or a plurality of juxtaposed wires simultaneously as a function of the thickness of the rib to be produced.

This additive manufacturing technique is difficult to employ in the case of intersecting ribs.

In fact, because of the successive passages of the energy beam for the first and second ribs, maintaining a high temperature at the level of a zone of intersection of the first and second ribs leads to overheating of that zone and therefore to modification of the crystal structure of the material liable to impact the mechanical properties of the material.

SUMMARY OF THE INVENTION

The present invention aims to remedy some or all of the disadvantages of the prior art.

To this end, the invention has for an object an additive method of manufacturing at least one intersection of main and secondary ribs by stacking layers of material, the main rib comprising at least one first section that extends in a first direction between first and second ends situated on respective opposite sides of the secondary rib, the secondary rib comprising at least one second section that extends in a second direction intersecting the first direction between first and second ends, the second end of the second section being close to the first section. In one operating method at least one layer of material of the first section is obtained by depositing at least one bead of material that extends in the first direction and connects the first and second ends.

According to the invention at least one layer of material of the second section comprises a first part obtained by depositing at least one bead of material at a distance from the first section that extends in the second direction and a second part obtained by depositing at least one bead of material adjacent to the first section that extends in the first direction.

This strategy of depositing beads of material at the level of an intersection of ribs limits the risks of overheating that zone and of deterioration of the mechanical properties of the material.

In accordance with another feature, the first part of the second section is obtained by depositing a plurality of rectilinear beads of material parallel to the second direction.

In accordance with another feature, at least one bead of material of the first part is connected to at least one bead of material of the second part in such a manner as to form a continuous bead.

In accordance with another feature, the second part of the second section is obtained by depositing a single bead of material parallel to the first direction. In accordance with another feature, at least one layer of material of the second section is obtained by depositing:

- a first L-shape bead of material that has a first part parallel to the first direction and adjacent to the first section and a second part parallel to the second direction extending as far as the first end of the second section,
- a second L-shape bead of material that has a first part parallel to the first direction and adjacent to the first section and a second part parallel to the second direction extending as far as the first end of the second section, parallel to and adjacent to the second part of the first L-shape bead of material.

In accordance with another feature, the first and second L-shape beads of material are connected in such as a manner as to form a continuous bead.

In accordance with another feature, the second part of the second section is obtained by depositing two beads of material parallel to each other and the first direction.

In accordance with another feature, at least one layer of material of the second section is obtained by depositing:

- two first beads of material parallel to each other and to the first direction and adjacent to the first section that extend on respective opposite sides of the second end of the second section,
- two second beads of material parallel to each other and to the second direction that extend from the first end of the second section as far as one of the first beads of material.

In accordance with another feature, the first two beads of material are connected to each other in such a manner as to form a continuous section.

In accordance with another feature, the second part of the second section is obtained by depositing three beads of material parallel to one another and to the first direction.

In accordance with another feature, at least one layer of material of the second section is obtained by depositing:

two first beads of material parallel to each other and to the first direction and adjacent to the first section that extend on respective opposite sides of the second end of the second section, a second L-shape bead of material having a first part parallel to the second direction that extends from the first end of the second section as far as one of the first beads of material and a second part parallel to and adjacent to one of the first beads of material, a third bead of material parallel to and adjacent to the first part of the second bead of material that extends from the first end of the second section as far as one of the first beads of material.

In accordance with another feature, the first beads of material and the L-shape second bead of material are connected to one another in such a manner as to form a continuous bead.

The invention also has for object a method of manufacturing a ribbed panel comprising a first blanking phase that enables rib blanks to be obtained including at least one intersection and obtained using the additive manufacturing method having any one of the above features and a second phase of machining the ribs to the finished dimensions. It also has for object a ribbed panel obtained using said manufacturing method.

BRIEF DESCRIPTION OF THE DRAWINGS

Other features and advantages will emerge from the following description of the invention given by way of example only with reference to the appended drawings, in which.

DETAILED DESCRIPTION OF THE PREFERRED EMBODIMENTS

Figure 1:
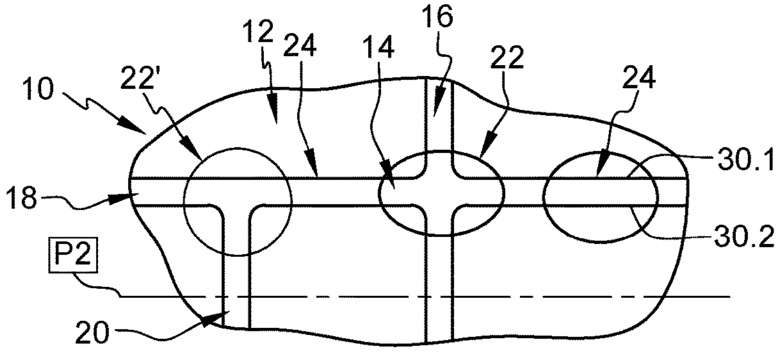
FIG. 1 is a view from above of a ribbed panel depicting one embodiment of the invention.
Figure 2:
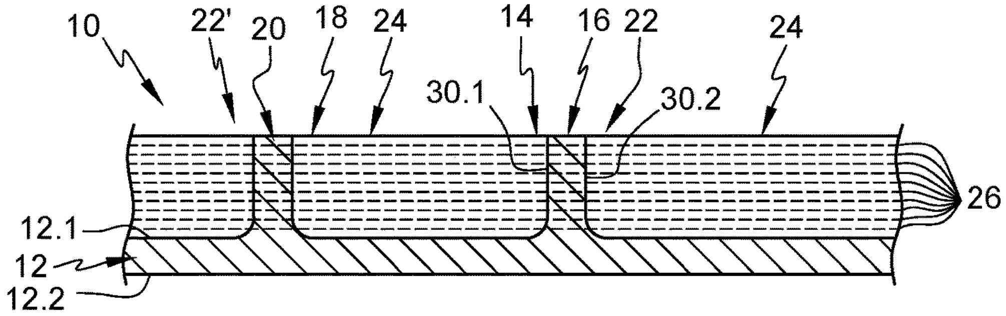
FIG. 2 is a section on the plane P2 of the ribbed panel that can be seen in FIG. 1.

In an embodiment that can be seen in FIGS. 1 and 2 a ribbed panel 10 comprises a wall 12 that has opposite first and second faces 12.1, 12.2 and at least one set of ribs 14, 16, 18, 20 on the first face 12.1 including at least two ribs 14, 16, 18, 20 intersecting at the level of at least one intersection 22, 22'. In one configuration the set of ribs comprises first and second ribs 14, 16 intersecting at the level of a first cruciform intersection 22, third and fourth ribs 18, 20 intersecting at the level of a T-shape second intersection 22' and connecting sections 24 outside the first and second connections 22, 22'. The first and third ribs 14, 18 may be one and the same rib.

The wall 12 may be obtained by any appropriate means, such as by a rolling technique for example. The method of manufacturing at least two intersecting ribs 14, 16, 18, 20 comprises a first blanking phase for obtaining rib blanks by additive manufacturing and a second phase of machining the ribs to the finished dimensions. In one configuration all the ribs 14, 16, 18, 20 are obtained by additive manufacturing by superposing layers of material 26 during the first blanking phase. Thereafter all the ribs 14, 16, 18, 20 and the first face 12.1 of the wall 12 are machined to the finished dimensions. This solution makes it possible to reduce the quantity of waste.

Each layer of material 26 comprises at least one bead of material obtained by melting at least one wire using a focused energy source. In one operating mode the focused energy source generates a beam of energy having a point of impact in a deposition zone situated on a substrate and at the level of which the material is in the form of at least one wire. The deposition zone is generally located in a controlled atmosphere having at least one controlled characteristic, for example the composition of the gas, the dynamics of the gases, the pressure or the temperature.

The substrate may be a support, a portion of a part or a layer of material already deposited.

The beam of energy may be a laser beam, an electron beam, a plasma beam or some other beam.

In one embodiment a manufacturing device comprises a deposition head configured to control the beam of energy and to focus it in the direction of the deposition zone and progressively to position the wire or wires in the deposition zone.

The substrate and the deposition zone undergo relative movement in a (generally horizontal) deposit plane in order for the bead of material deposited to follow a deposition trajectory 28. In a first configuration the deposition zone (and in particular the deposition head) is fixed in the deposit plane and the substrate is moved relative to the deposition zone in the deposit plane as a function of the required deposition trajectory 28. In this first configuration, outside the deposit plane, the deposition head may be moved vertically. In a second configuration the substrate is fixed and the deposition zone (and in particular the deposition head) is moved relative to the substrate as a function of the required deposition trajectory 28. In a third configuration the deposition zone (and in particular the deposition head) is mobile in the plane of the deposit.

Figure 11:
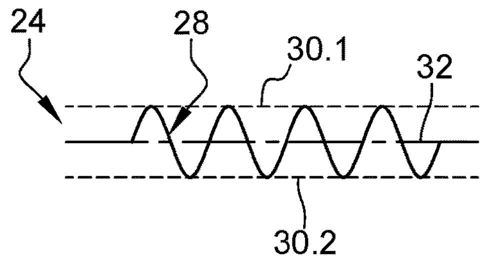
FIG. 11 is a representation of a trajectory of a deposit of material enabling a rib to be obtained depicting a first embodiment of the invention.
Figure 12:
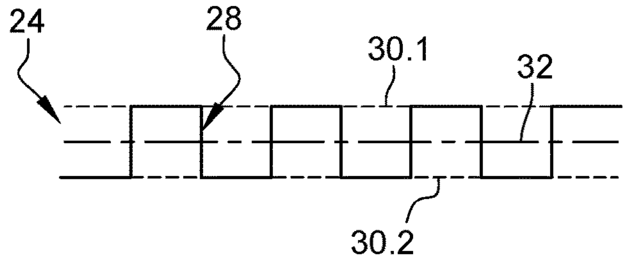
FIG. 12 is a representation of a trajectory of a deposit of material enabling a rib to be obtained depicting a second embodiment of the invention.
Figure 13:
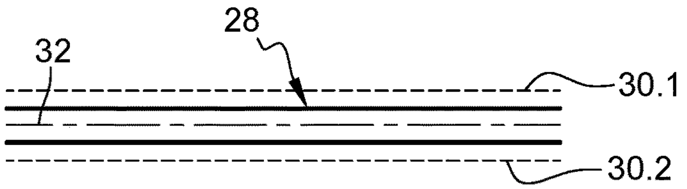
FIG. 13 is a representation of a trajectory of a deposit of material enabling a rib to be obtained depicting a third embodiment of the invention.

At the level of the connecting sections 24 each rib 14 has two lateral faces 30.1, 30.2 and a width corresponding to the distance separating the two lateral faces 30.1, 30.2. Each rib follows a profile 32 corresponding to a line situated equidistantly from the two lateral faces 30.1, 30.2. To simplify the representation the profile 32 that can be seen in FIGS. 11 to 13 is rectilinear. Of course the invention is not limited to this geometry for the profile 32. Thus the latter could be curved or comprise a combination of rectilinear portions.

In a first embodiment that can be seen in FIG. 11, for each layer of material 26 in line with a connecting section 24 the deposition trajectory 28 of the bead of material oscillates on either side of the profile 32 as it follows a sinusoidal trajectory between the two lateral faces 30.1, 30.2.

In a second embodiment that can be seen in FIG. 12, for each layer of material 26 in line with a connecting section 24 the deposition trajectory 28 of the bead of the material oscillates on either side of the profile 32 as it follows a crenelated trajectory between the two lateral faces 30.1, 30.2.

In a third embodiment that can be seen in FIG. 13, for each layer of material 26 in line with a connection section 24 the deposition trajectory 28 of at least two beads of material is parallel to the profile 32 between the two lateral faces 30.1, 30.2.

Of course, the invention is not limited to these deposition trajectories. Whatever the operating mode, the number of juxtaposed beads of deposited material and/or the deposition trajectory 28 are determined as a function of the required width of the rib in line with the connecting section 24.

In the embodiments that can be seen in FIGS. 3 to 6 the first cruciform intersection 22 comprises a first section 34 for the first rib 14 and second and third sections 36, 38 for the second rib 16 positioned on respective opposite sides of the first section 34. The first section 34 extends in a first direction D34 between first and second ends 34.1, 34.2 positioned on respective opposite sides of the second and third sections 36, 38. The second section 36 extends in a second direction D36 between first and second ends 36.1, 36.2, the second end 36.2 being adjacent to the first section 34. The third section 38 extends in a third direction D38 between first and second ends 38.1, 38.2, the second end 38.2 being adjacent to the first section 34. The second and third directions D36, D38 are substantially aligned. The first and second ends 34.1, 34.2 are disposed on respective opposite sides of the second and third sections 36, 38.

In one configuration the first direction D34 of the first section 34 is substantially perpendicular to the second and third directions D36, D38 of the second and third sections 36, 38. Of course, the invention is not limited to this configuration.

In the embodiments that can be seen in FIGS. 3 to 6, for at least one layer of material 26 and preferably for each layer of material 26 the first section 34 is obtained by depositing first and second beads of material 40, 40' substantially parallel to each other and to the first direction D34, joining the first and second ends 34.1, 34.2. In one configuration the first and second beads of material 40, 40' are continuous and connected to each other at the level of the first or second end 34.1, 34.2. For at least one layer of material 26 and preferably for each layer of material 26 the first and second beads of material 40, 40' are therefore obtained using a deposition trajectory 42 comprising a starting point D42 situated at the level of the first end 34.1, a to-and-fro path connecting the first and second ends 34.1, 34.2, and a point of arrival F42 adjacent to the starting point D42.

Figure 3:
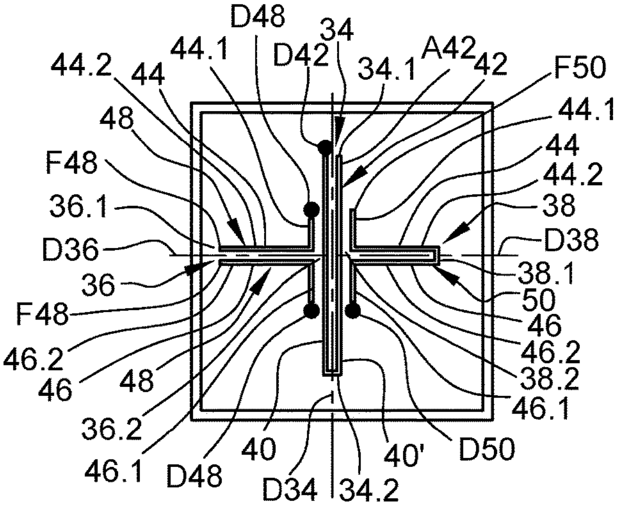
FIG. 3 is a schematic representation of trajectories of a deposit of material enabling a cruciform intersection to be obtained depicting a first method of executing the invention.

In a first embodiment that can be seen in FIG. 3, for at least one layer of material 26 and preferably for each layer of material 26 each second or third section 36, 38 is obtained by depositing:

- a first L-shape bead of material 44 that has a first part 44.1 parallel to the first direction D34 and adjacent to the first or second bead of material 40, 40' of the first section 34 and a second part 44.2 parallel to the second direction D36 or D38 extending as far as the first end 36.1, 38.1 of the second or third section 36, 38;
- a second L-shape bead of material 46 which has a first part 46.1 parallel to the first direction D34 and adjacent to the first or second bead of material 40, 40' of the first section 34 and a second part 46.2 parallel to the second direction D36 or D38 extending as far as the first end 36.1, 38.1 of the second or third section 36, 38, parallel to and adjacent to the second part 44.2 of the first L-shape bead of material 44.

In one configuration the first and second L-shape beads of material 44, 46 are separate, as depicted in FIG. 3 for the second section 36. For at least one layer of material 26 and preferably for each layer of material 26 each of the first and second L-shape beads of material 44, 46 is obtained using a deposition trajectory 48 comprising a starting point D48 situated between the first or second end 34.1, 34.2 of the first section 34 and the second end 36.2 of the second section 36, an L-shape path and a point of arrival F48 situated at the level of the first end 36.1 of the second section 36.

In another configuration the first and second L-shape beads of material 44, 46 are connected at the level of the first end 38.1 of the third section 38 in such a manner as to form a continuous bead, as depicted in FIG. 3 for the third section 38. For at least layer of material 26 and preferably for each layer of material 26 the first and second L-shape beads of material 44, 46 are obtained using a deposition trajectory 50 comprising a starting point D50 situated between the second end 34.2 of the first section 34 and the second end 38.2 of the third section 38, a first L-shape path as far as the first end 38.1 of the third section 38, a second L-shape path and a point of arrival F50 situated between the first end 34.1 of the first section 34 and the second end 38.2 of the third section 38.

Figure 4:
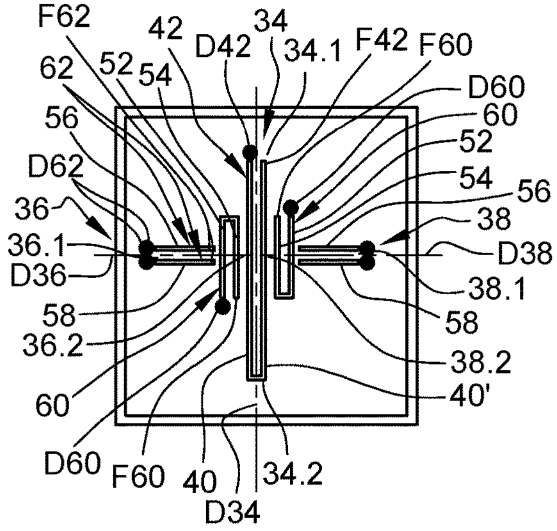
FIG. 4 is a schematic representation of trajectories of deposits of material enabling a cruciform intersection to be obtained depicting a second embodiment of the invention.

In a second embodiment that can be seen in FIG. 4, for at least one layer of material 26 and preferably for each layer of material 26 the second or third section 36, 38 is obtained by depositing:

- two first beads of material 52, 54 parallel to each other and to the first direction D34 and adjacent to the first section 34 that extend on respective opposite sides of the second end 36.2, 38.2 of the second or third section 36, 38,
- two second beads of material 56, 58 parallel to each other and to the second or third direction D36, D38 that extend from the first end 36.1, 38.1 of the second or third section 36, 38 as far as one of the first beads of material 52.

In one configuration the two first beads of material 52, 54 are connected to each other in such a manner as to form a continuous section. Thus, for at least one layer of material 26 and preferably for each layer of material 26 the first two beads of material 52, 54 are obtained using a deposition trajectory 60 comprising a starting point D60 situated between the first or second end 34.1, 34.2 of the first section 34 and the second end 36.2, 38.2 of the second or third section 36, 38, a to-and-fro path and a point of arrival F60 adjacent to the starting point D60. In one embodiment, for the second section 36 the starting point D60 is close to the second end 34.2 of the first section 34. For the third section 38 the starting point D60 is close to the first end 34.1 of the first section 34.

Each of the second beads of material 56, 58 is obtained using a deposition trajectory 62 comprising a starting point D62 at the level of the first end 36.1, 38.1 of the second or third section 36, 38, a rectilinear path and a point of arrival F62 adjacent to the first beads of material 52, 54. In an alternative, the starting point D62 could be adjacent to the first beads of material 52, 54 and the point of arrival F62 situated at the level of the first end 36.1, 38.1 of the second or third section 36, 38.

Figure 5:
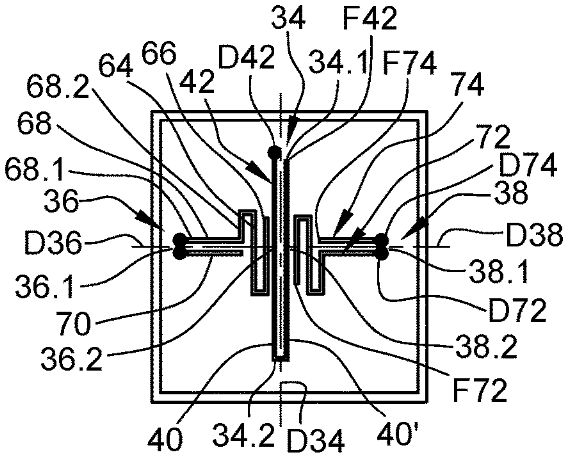
FIG. 5 is a schematic representation of trajectories of deposits of material enabling a cruciform intersection to be obtained depicting a third embodiment of the invention.

In a third embodiment that can be seen in FIG. 5, for at least one layer of material 26 and preferably for each layer of material 26 the second or third section 36, 38 is obtained by depositing:

- two first beads of material 64, 66 parallel to each other and to the first direction D34 and adjacent to the first section 34 that extend on respective opposite sides of the second end 36.2, 38.2 of the second or third section 36, 38,
- a second L-shape bead of material 68 having a first part 68.1 parallel to the second or third direction D36, D38 that extends from the first end 36.1, 38.1 of the second or third section 36, 38 as far as one of the first beads of material 64 and a second part 68.2 parallel to and adjacent to one of the first beads of material 64,
- a third bead of material 70 parallel to and adjacent to the first part 68.1 of the second bead of material 68 that extends from the first end 36.1, 38.1 of the second or third section 36, 38 as far as one of the first beads of material 64.

In one configuration the first beads of material 64, 66 and the second L-shape bead of material 68 are connected to each other to form a continuous bead. Thus, for at least one layer of material 26 and preferably for each layer 26 the first beads of material 64, 66 and the second bead of material 68 are obtained using a deposition trajectory 72 comprising a starting point D72 situated at the level of the first end 36.1, 38.1 of the second or third section 36, 38, a first L-shape path followed by a second to-and-fro path and a point of arrival F72 situated between the first or second end 34.1, 34.2 of the first section 34 and the second end 36.2, 38.2 of the second or third section 36, 38. For at least one layer of material 26 and preferably for each layer of material 26 the third bead 70 is obtained using a deposition trajectory 74 comprising a starting point D74 situated at the level of the first end 36.1, 38.1 of the second or third section 36, 38, a rectilinear path and a point of arrival F74 adjacent to one of the first beads of material 64. In an alternative, the starting point D74 is adjacent to one of the first beads of material 64 and the point of arrival F74 is situated at the level of the first end 36.1, 38.1 of the second or third section 36, 38.

Figure 6:
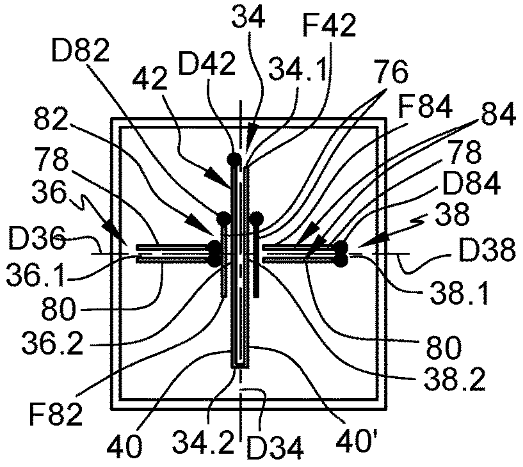
FIG. 6 is a schematic representation of trajectories of deposits of material enabling a cruciform intersection to be obtained depicting a fourth embodiment of the invention.

In a fourth embodiment that can be seen in FIG. 6, for at least one layer of material 26 and preferably for each layer of material 26 the second or third section 36, 38 is obtained by depositing:

- a first bead of material 76 parallel to the first direction D34 and adjacent to the first section 34 that extends on respective opposite sides of the second end 36.2, 38.2 of the second or third section 36, 38,
- two second beads of material 78, 80 parallel to each other and to the second or third direction D36, D38 that extend from the first end 36.1, 38.1 of the second or third section 36, 38 as far as the first bead of material 76.

For at least one layer of material 26 and preferably for each layer of material 26 the first bead of material 76 is obtained using a deposition trajectory 82 comprising a starting point D82 situated between the first end 34.1 of the first section 34 and the second end 36.2, 38.2 of the second or third section 36, 38, a rectilinear path and a point of arrival F82 situated between the second end 34.2 of the first section 34 and the second end 36.2, 38.2 of the second or third section 36, 38. Additionally, for at least one layer of material 26 and preferably for each layer of material 26 each second bead of material 78, 80 is obtained using a deposition trajectory 84 comprising a starting point D84 situated at the level of the first end 36.1, 38.1 of the second or third section 36, 38, a rectilinear path and a point of arrival F84 adjacent to the first bead of material 76. In an alternative, the starting point D84 is adjacent to the first bead of material 76 and the point of arrival F84 is situated at the level of the first end 36.1, 38.1 of the second or third section 36, 38.

In embodiments that can be seen in FIGS. 7 to 10 the second T-shape intersection 22' comprises a first section 34 for the first rib 14 and a second section 36 for the second rib 16. The first section 34 extends in a first direction D34 between first and second ends 34.1, 34.2 positioned on respective opposite sides of the second section 36. The second section 36 extends in a second direction D36 between first and second ends 36.1, 36.2, the second end 36.2 being adjacent to the first section 34.

For the embodiments that can be seen in FIGS. 7 to 10 the first second 34 is produced in the same way as for the operating modes that can be seen in FIGS. 3 to 10.

Figure 7:
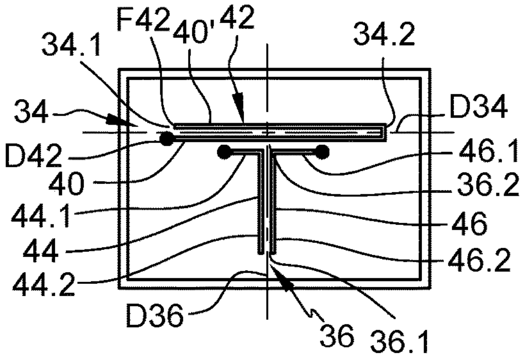
FIG. 7 is a schematic representation of trajectories of deposits of material enabling a T-shape intersection to be obtained depicting a first embodiment of the invention.

In the embodiment that can be seen in FIG. 7 the second section 36 is produced in the same way as that which can be seen in FIG. 3.

Figure 8:
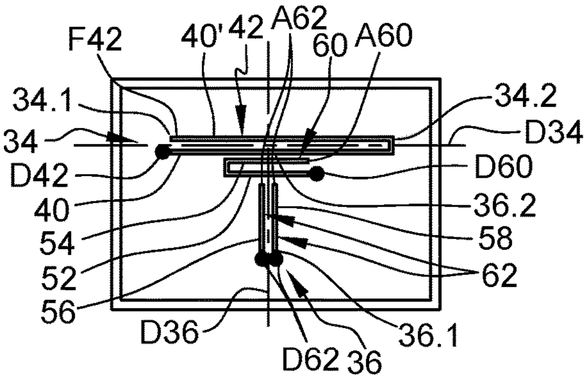
FIG. 8 is a schematic representation of trajectories of deposits of material enabling a T-shape intersection to be obtained depicting a second embodiment of the invention.

In the embodiment that can be seen in FIG. 8 the second section 36 is produced in the same way as that which can be seen in FIG. 4.

Figure 9:
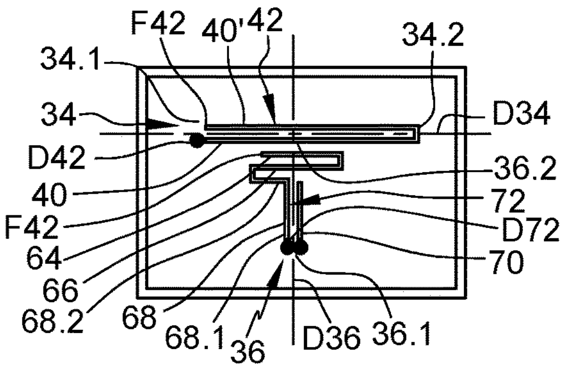
FIG. 9 is a schematic representation of trajectories of deposits of material enabling a T-shape intersection to be obtained depicting a third embodiment of the invention.

In the embodiment that can be seen in FIG. 9 the second section 36 is produced in the same way as that which can be seen in FIG. 5.

Figure 10:
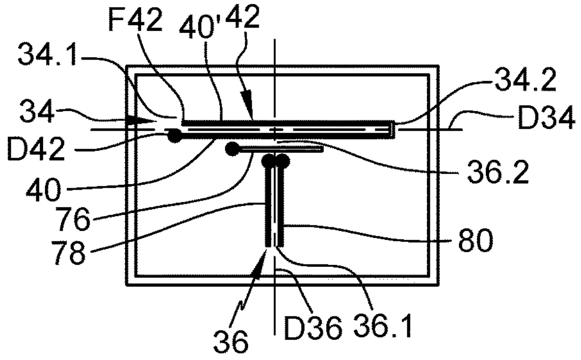
FIG. 10 is a schematic representation of trajectories of deposits of material enabling a T-shape intersection to be obtained depicting a fourth embodiment of the invention.

In the embodiment that can be seen in FIG. 10 the second section 36 is produced in the same way as that which can be seen in FIG. 6.

Of course, the invention is not limited to the embodiments described above. Regardless of the embodiment, an intersection 22, 22' of ribs comprises a main rib 14, 18 and a secondary rib 16, 20, the main rib 14, 18 comprising at least one first section 34 that extends in a first direction D34 between first and second ends 34.1, 34.2, the second rib 16, 20 comprising at least a second section 36 that extends in a second direction D36 intersecting the first direction D34 between first and second ends 36.1, 36.2. The second end 36.2 of the second section 36 is close to the first section 34, the first and second ends 34.1, 34.2 of the first section 34 being positioned on respective opposite sides of the second end 36.2 of the second section 36.

For at least one layer of material 26 and preferably for all the layers of material 26 the first section 34 is obtained by depositing at least one bead of material 40, 40' that extends in the first direction D34 and connects the first and second ends 34.1, 34.2. The first section 34 may comprise a single bead of material 40, 40' that is rectilinear and parallel to the first direction D34 or oscillates to either side of the first section D34. As an alternative, the first section 34 comprises a plurality of beads of material 40, 40' that are rectilinear and parallel to the first direction D34 and are separate or continuous.

For at least one layer of material 26 and preferably for all the layers of material 26 the second section 36 comprises a first part obtained by depositing at least one bead of material at a distance from the first section 34 that extends in the second direction D36 and a second part obtained by depositing at least one bead of material adjacent to the first section 34 that extends in the first direction D34.

The first part of the second section 36 may comprise a single bead of material that is rectilinear and parallel to the second direction D36 or oscillates to either side of the second direction D36. As an alternative, the first part of the second section 36 comprises a plurality of separate or continuous beads of material that are rectilinear and parallel to the second direction D36.

The second part of the second section 36 may be obtained by depositing:

- a single bead of material 44.1, 76 parallel to the first direction D34, as depicted in FIGS. 3, 6, 7 and 10,
- two separate or continuous beads of material 52, 54 parallel to each other and to the first direction D34, as depicted in FIGS. 4 and 8,
- three separate or continuous beads of material 64, 66, 68.2 parallel to each other and to the first direction D34, as depicted in FIGS. 5 and 9.

In embodiments that can be seen in FIGS. 3, 5, 7 and 9 at least one bead of material of the first part is connected to at least one bead of material of the second part in such a manner as to form a continuous bead.

These various embodiments make it possible to obtain an increased thickness of material at the level of the intersections by controlling the shapes of the various beads of material and without excessive overheating of the material.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An additive method of manufacturing at least one intersection of a main rib and a secondary rib comprising:

- stacking layers of material to form the main rib and the secondary rib,
- wherein the main rib comprises a first section that extends in a first direction between first and second ends situated on respective opposite sides of the secondary rib,
- wherein secondary rib comprises a second section that extends in a second direction intersecting the first direction between first and second ends, the second end of the second section being close to the first section,
- wherein a layer of material of the first section is obtained by depositing at least one bead of material that extends in the first direction and connects the first and second ends,
- wherein a layer of material of the second section comprises
  - a first part obtained by depositing at least one bead of material at a distance from the first section that extends in the second direction and
  - a second part obtained by depositing at least one bead of material adjacent to the first section that extends in the first direction,
- wherein the at least one bead of material of the second part of the second section is obtained by depositing two beads of material parallel to each other and the first direction, and
- wherein the two beads of material of the second part of the second section are obtained by depositing:
- two first beads of material parallel to each other and to the first direction and adjacent to the first section that extend on respective opposite sides of the second end of the second section, and
- two second beads of material parallel to each other and to the second direction that extend from the first end of the second section as far as one of the two first beads of material.

2. The additive method of manufacturing as claimed in claim 1, wherein the at least one bead of material of the first part of the second section is obtained by depositing a plurality of rectilinear beads of material parallel to the second direction.

3. The additive method of manufacturing as claimed in claim 1, wherein the at least one bead of material of the first part is connected to the at least one bead of material of the second part in such a manner as to form a continuous bead.

4. The additive method of manufacturing as claimed in claim 1, wherein the at least one bead of material of the second part of the second section is obtained by depositing a single bead of material parallel to the first direction.

5. The additive method of manufacturing as claimed in claim 1, wherein the at least one bead of material of at least one layer of material of the second section is obtained by depositing:

- a first L-shape bead of material that has a first part parallel to the first direction and adjacent to the first section and a second part parallel to the second direction extending as far as the first end of the second section, and
- a second L-shape bead of material that has a first part parallel to the first direction and adjacent to the first section and a second part parallel to the second direction extending as far as the first end of the second section, parallel to and adjacent to the second part of the first L-shape bead of material.

6. The additive method of manufacturing as claimed in claim 5, wherein the first and second L-shape beads of material are connected in such as a manner as to form a continuous bead.

7. The additive method of manufacturing as claimed in claim 1, wherein the two first beads of material are connected to each other in such a manner as to form a continuous section.

8. The additive method of manufacturing as claimed in claim 1, wherein the at least one bead of material of the second part of the second section is obtained by depositing three beads of material parallel to one another and to the first direction.

9. The additive method of manufacturing as claimed in claim 1, wherein the at least one bead of material of the second section is obtained by depositing:

two first beads of material parallel to each other and to the first direction, adjacent to the first section, that extend on respective opposite sides of the second end of the second section, a second L-shape bead of material having a first part parallel to the second direction that extends from the first end of the second section as far as one of the two first beads of material and a second part parallel to and adjacent to one of the two first beads of material, and a third bead of material parallel to and adjacent to the first part of the second L-shape bead of material that extends from the first end of the second section as far as one of the first beads of material.

10. The additive method of manufacturing as claimed in claim 9, wherein the two first beads of material and the second L-shape bead of material are connected to one another in such a manner as to form a continuous bead.

11. A method of manufacturing a ribbed panel, the method comprising:

a first blanking phase that enables rib blanks to be obtained, including at least one intersection, with the additive method of manufacturing of claim 1, and a second phase of machining the ribs to the finished dimensions.

* * * * *